United States Patent [19]
Tyler

[11] Patent Number: 5,531,403
[45] Date of Patent: Jul. 2, 1996

[54] ATTACHMENT FRAME FOR MOUNTING CAMERA EQUIPMENT TO AN AIRCRAFT

[76] Inventor: Nelson Tyler, 15801 Royal Oak Rd., Encino, Calif. 90436

[21] Appl. No.: 251,022

[22] Filed: May 31, 1994

[51] Int. Cl.⁶ ................................................ B64D 9/00
[52] U.S. Cl. .......................... 244/118.1; 354/74
[58] Field of Search ................... 244/1 R, 118.1, 244/137.4, 129.1, 129.6, 118.6; 354/65, 74, 81, 293, 294; 348/144

[56] References Cited

U.S. PATENT DOCUMENTS

| | | | |
|---|---|---|---|
| 3,823,901 | 7/1974 | Holmes et al. | 244/118.1 |
| 4,115,884 | 9/1978 | Keogh | 244/118.6 |
| 4,162,776 | 7/1979 | Sibley et al. | 354/74 |
| 4,609,168 | 9/1986 | Dear et al. | 244/118.1 |
| 4,669,843 | 6/1987 | Bozzolato | 354/74 |
| 5,191,370 | 3/1993 | Bozzolato | 244/118.1 |
| 5,328,133 | 7/1994 | Charest et al. | 244/118.1 |

FOREIGN PATENT DOCUMENTS

| | | | |
|---|---|---|---|
| 5085492 | 4/1993 | Japan | 244/118.1 |

OTHER PUBLICATIONS

John Creighton "Stable Images In Film & Video" Helicopter World Oct.–Dec. 1986 p. 34 (USA).

*Primary Examiner*—Galen L. Barefoot
*Attorney, Agent, or Firm*—Joseph F. McLellan

[57] ABSTRACT

An attachment frame for mounting camera equipment to an aircraft such as a helicopter. The frame is adapted to be readily detachably mounted to attach points located adjacent the rear seat support within the rear passenger compartment. For added strength, the frame can also be mounted to the helicopter skid. The frame is adapted to rest upon the seat support and is elongated for projection through the compartment and out its opposite sides for mounting a camera pod and an accessories package at its opposite extremities, respectively. The frame includes extensible elements such as turnbuckles which are pivotally mounted to the frame and to bearing pads adapted to rest against the rear bulkhead of the rear passenger compartment. Extension of the extension elements urges the frame against the seat support and urges the bearing pads against the rear bulkhead to snugly hold the frame in position.

12 Claims, 7 Drawing Sheets

ATTACHMENT FRAME FOR MOUNTING CAMERA EQUIPMENT TO AN AIRCRAFT

BACKGROUND OF THE INVENTION

1. Field of the Invention

The present invention relates to an elongated structure which supports a camera pod and an accessories package at its opposite ends, and which is adapted for mounting to an aircraft such as a helicopter.

2. Description of the Prior Art

It is common practice to mount camera equipment such as a spherical camera pod and an accessories package at opposite ends of an elongated support structure which is detachably connected to an aircraft. It is desirable that the support structure be easily and quickly installable, and be equally easily demountable when a filming assignment is concluded.

A currently popular aircraft for film use is a Bell Jet Ranger helicopter. It has "hard" or attach points located exteriorly of the craft, a wartime design that enables lowering and hoisting of personnel and equipment. These attach points are used as anchorages for camera equipment supports of the prior art.

One such support includes an elongated bar or tube which extends transversely through the rear passenger compartment of a Ranger model helicopter. It is positioned just above the shoulders of the cameraman and is securely held in position by attachment to a pair of support elements that are fixed to attach points located on opposite sides of the aircraft above and below the rear doors. The rear doors must be removed and left off during flight to permit this mounting arrangement. The camera pod and accessories package are suspended from the opposite ends of the tube by large, vertically oriented support bolts and fasteners.

The support can be relatively quickly mounted to or removed from the helicopter when a filming assignment is completed, but it cannot be easily mounted to a helicopter that is not provided with externally located attach points. Moreover, it is awkward and uncomfortable to film with the helicopter doors removed. The present system provides a means for mounting a camera equipment support system to an aircraft such as a helicopter by attaching it to interiorly located structure of the aircraft.

SUMMARY OF THE INVENTION

According to the present invention, an attachment frame is provided for mounting camera equipment to aircraft such as the Bell Jet Ranger Series helicopters. The frame preferably comprises a pair of elongated support arms or tubes which rest upon the rear seat support in the passenger compartment. The tubes are connected together or made integral by interconnecting struts and braces.

The rear tube is attachable to the existing seat belt tabs, either directly or by means of special brackets. The tabs are located adjacent the fire wall or rear bulkhead approximately at the juncture of the fire wall with the rear seat support. This fixes the attachment frame against fore and aft and lateral movement.

The frame also comprises a pair of transversely spaced apart pivot arms which are connected at their lower extremities to the rear tube and at their upper extremities to a pair of thrust pads, respectively. The thrust pads are adapted to rest against the helicopter rear bulkhead.

Anchorage portion of the attachment frame adjacent the front tube includes a pair of transversely spaced apart attachment tabs, respectively. These are connected to the lower ends of a pair of turnbuckles. The upper ends of the turnbuckles are attached to a similar pair of attachment tabs that are mounted to the pair of pivot arms.

Operation of the turnbuckles to extend their opposite ends forcibly urges the thrust pads against the rear bulkhead, and the anchorage portions toward the rear seat support. This firmly holds the attachment frame in position.

Thus, the attachment frame can be quickly mounted in position by coupling the rear tube to the existing helicopter seat belt tabs, and thereafter adjusting the turnbuckles to preload the thrust pads against the rear bulkhead.

A variation of the Foregoing is to employ only a single tube in the attachment frame and, instead of mounting the turnbuckle attachment tabs on a forwardly disposed portion of a two-tube frame, the tabs are integral with the forward extremities of a pair of transversely spaced apart, elongated anchorage portions or elements which project forwardly of the single rear tube. Thrust pads carried by the elements rest upon the seat support at their forward extremities.

The ends of the attachment frame tubes project out of the rear passenger compartment, and the camera pod and accessories package are suitably mounted to these ends, the weight of each being counterbalanced by such mounting.

In the present invention each of the existing helicopter passenger rear doors can be replaced by a fixed rear door panel having an opening or openings through which the attach frame can project. A pair of smaller forward doors can then be fitted into position for closure during flight operations.

For added stability and structural rigidity, a pair of additional turnbuckles can be mounted between the rear tube and a pair of pull tubes and brackets carried by the helicopter skid structure in transversely spaced apart relation. Tightening the turnbuckles to pull the turnbuckle ends together has the effect of pulling the rear tube of the attachment frame downwardly and rearwardly to firmly hold it in proper position.

Other features and advantages of the invention will become apparent from the following detailed description, taken in conjunction with the accompanying drawings which illustrate, by way of example, the features of the invention.

DESCRIPTION OF THE PREFERRED EMBODIMENTS

Referring now to the drawings, and particularly to FIGS. 1–8, there is illustrated an attachment frame for mounting camera equipment to an aircraft, in this case a Ranger model of Bell helicopter. The frame is adapted for use with other aircraft, and reference to the Ranger model helicopter is therefore merely by way of example.

The illustrated helicopter is characterized by a rear passenger compartment having a pair of doors on either side. In the prior art, these doors had to be removed and left off during flight in order to accommodate the prior art camera equipment support structure. In addition, such structure has to be connected to certain exteriorly located "hard" or attach points (not shown) on the helicopter. On later versions of such helicopters the attach points are not present.

As will be seen, the present attachment frame can be mounted in position within the rear passenger compartment using only the four seat belt attachment tabs 10 originally fitted to the helicopter. The attachment frame rests upon a rear seat support 12 located in the rear passenger compartment adjacent a fire wall or rear bulkhead 14. As will be seen, the attachment frame can also be secured to the helicopter skid structure 11 for extra structural rigidity.

Figure 3:
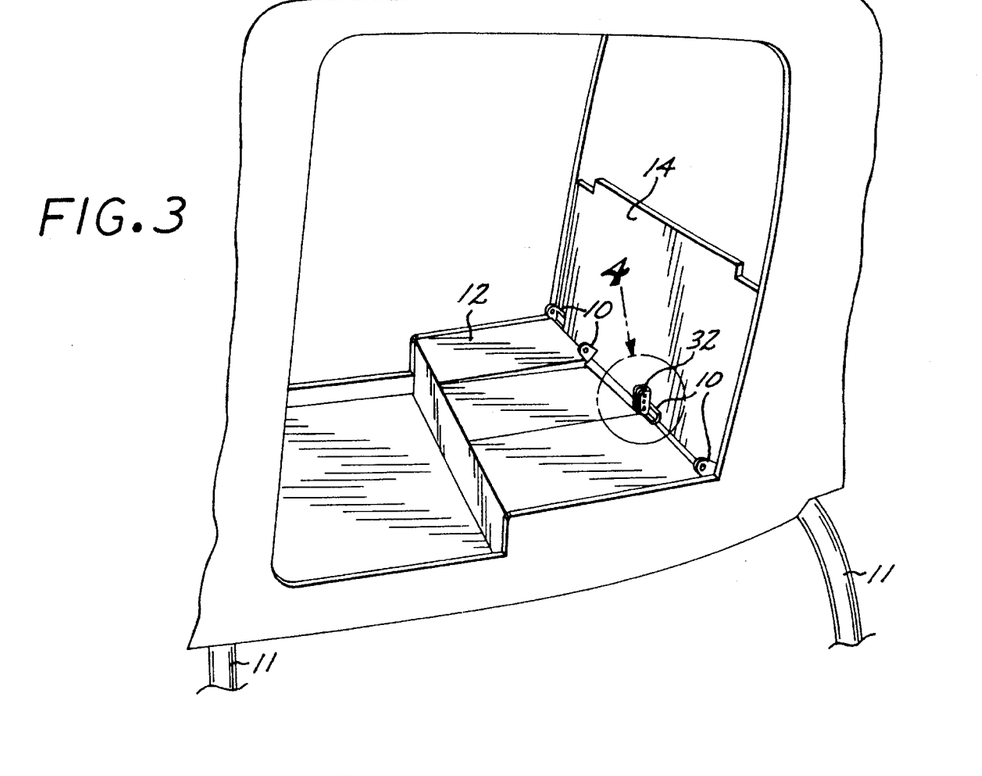
FIG. 3 is a partial left side elevational view, looking into the rear passenger compartment of the helicopter, with the seat belts, rear seat cushions and rear doors removed.
Figure 4:
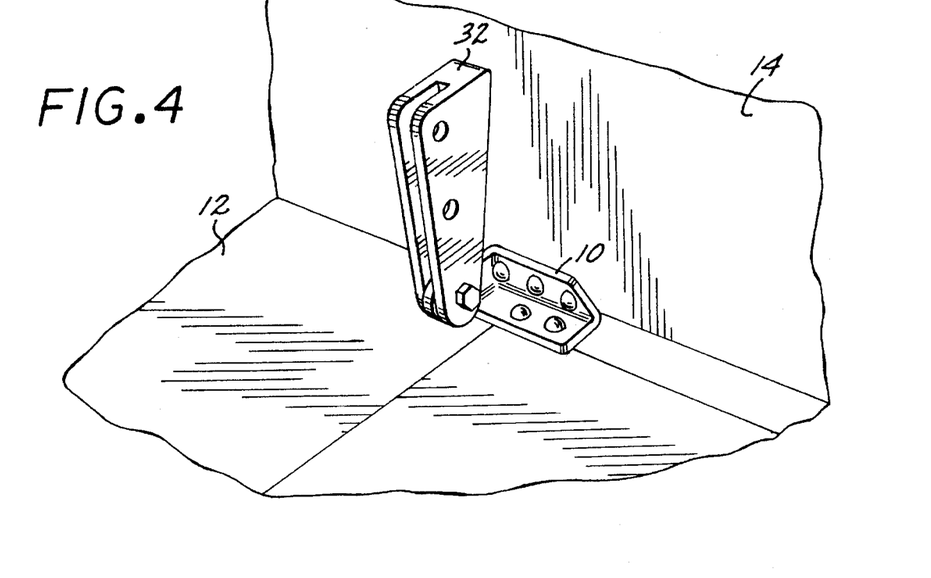
FIG. 4 is a detail perspective view of that portion of FIG. 3 indicated by the numeral 4, and illustrating an attach bracket mounted to a seat belt tab on the rear seat support.

Before installing the present attachment frame, the original helicopter rear passenger doors, seat and back cushions, and seat belts are removed, as seen in FIG. 3.

Figure 9:
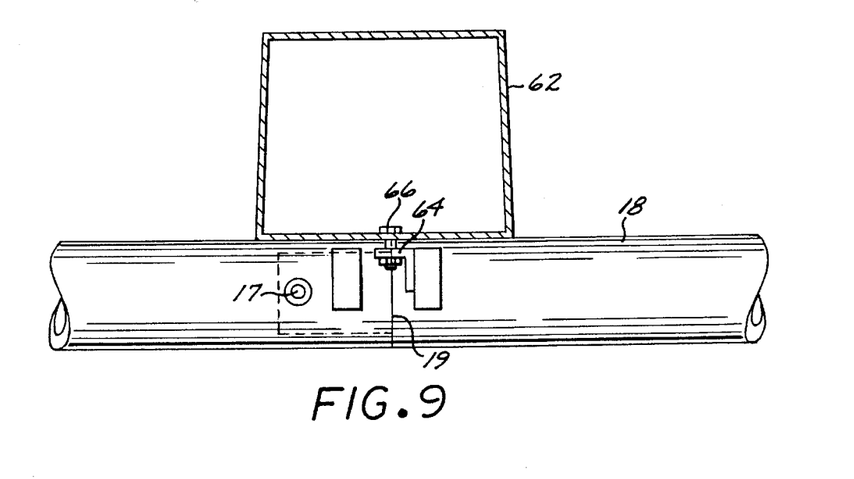
FIG. 9 is a partial front elevational view of the juncture of the two halves of the attachment frame support tubes taken along the line 9—9 of FIG. 5, and illustrating the mounting of a control console to the frame.

The attachment frame comprises elongated support structure or tubing means having a forwardly disposed portion and a rearwardly disposed portion in the form of a pair of generally parallel front and rear support arms or tubes 16 and 18. The tubes include straight central portions which rest upon the rear seat support 12, with the rear tube 18 being located next to the rear bulkhead 14. Preferably the frame is made in two halves which fit together at the middle. This can be done in any suitable fashion to enable easy assembly and separation for easier transportation and storage. In the embodiment illustrated, as seen in FIG. 9, the tubes 16 and 18 are provided with interconnecting receptacle and insertion portions. The insertion portions are slipped into the receptacle portions in telescoping fashion and held in assembled position by a quick disconnect fastener 17 known in the trade as a "Pip" pin. The fastener passes through aligned openings in the adjacent ends of the support tubes to hold them together at their abutting end margins 19. As well known to those skilled in the art, the barrel of the pin can be retracted relative to the rod of the pin, against an internal bias, to bring balls (not shown) into release positions. This enables rapid assembly of a pair of parts. Conversely, the rod and barrel can be released to enable the internal bias means to move the rod and barrel relative to one another to move the balls into locking positions preventing removal of the fastener.

Figure 1:
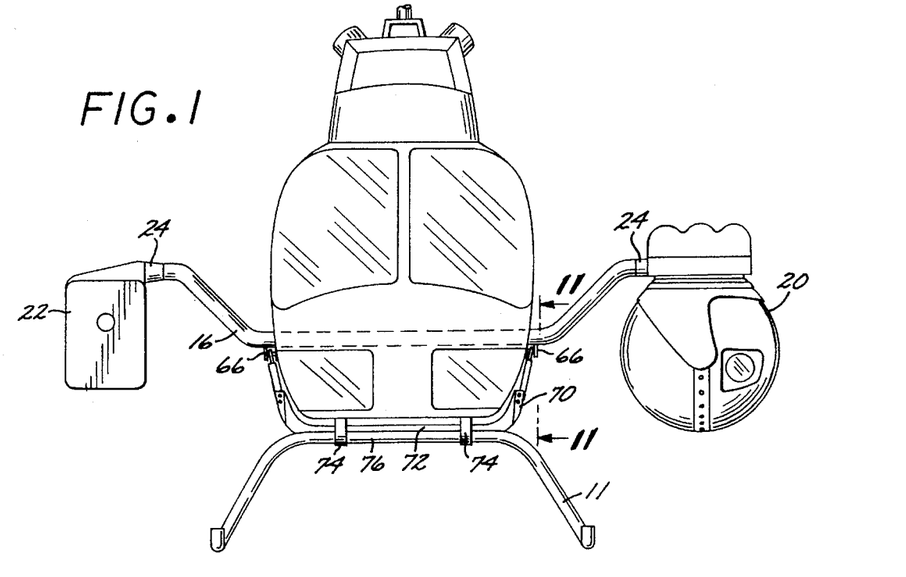
FIG. 1 is a front elevational view of a helicopter to which the preferred embodiment of the attachment frame of the present invention is mounted.

The frame support tubes 16 and 18 are curved laterally upwardly and outwardly from their central portions, as best seen in FIG. 1. This locates the tube extremities above the level of the helicopter skid structure and provides ground clearance for a camera pod 20 and accessories package 22 which are mounted to such extremities, respectively.

Any suitable mounting means may be employed that is effective to securely attach the pod and package in position. In the single support tube embodiment of FIG. 14, heavy, vertically oriented bolt-like fasteners (not shown) are disposed through vertical openings in the opposite extremities of the tube 18a. They extend into suitable receptacles in the camera pod and accessories package, and are held there by suitable nuts (not shown).

However, in the preferred twin tube embodiment of FIGS. 1–13, use of the quick disconnect fasteners 17 is more practical. For this purpose each of the tube ends is provided with an insert portion or fork (not shown) that has an opening for the fastener.

The pair of spaced apart forks at each end of the attachment frame are insertable into complemental cavities, sockets or receptacles 24 in the camera pod 20 and accessories package 22. Fasteners 17 pass through openings (not shown) in the receptacles, and into corresponding openings in the forks. With this arrangement the pod 20 and package 22 can quickly and easily be mounted and demounted as desired.

The particular design of the camera pod 20 and the accessories package 22 are not part of the present invention. The camera pod holds the camera and film and associated controls, while the accessories package contains a diesel generator, batteries or the like to provide sufficient auxiliary power to operate the camera without draining the power supply of the helicopter. Thus, use of the present attachment frame for mounting within the rear passenger compartment of a helicopter is not limited to a particular aircraft or to specific camera equipment.

Figure 2:
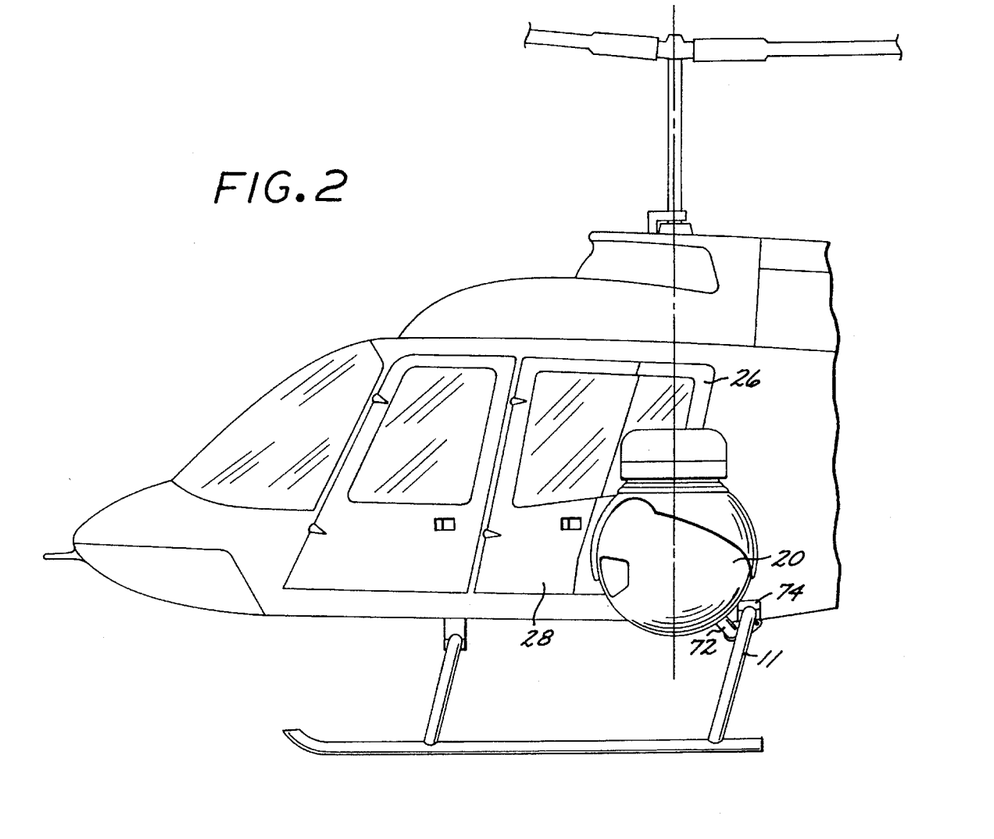
FIG. 2 is a partial left side elevational view of the helicopter and attachment frame of FIG. 1.
Figure 13:
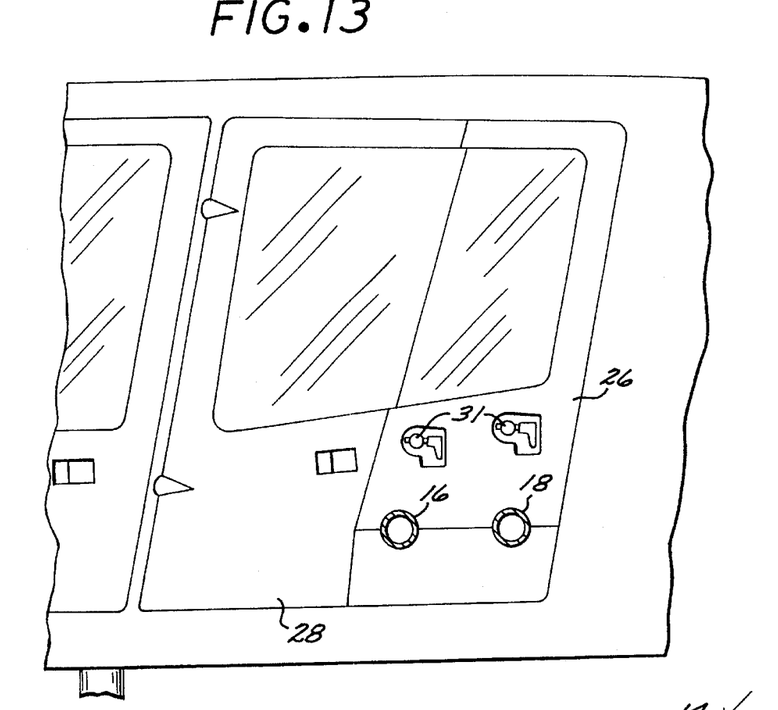
FIG. 13 is a detail left side elevational view of the reconfigured rear panel and rear door.

Each of the original equipment rear doors (not shown) of the helicopter are removed and each is replaced by a rear door panel 26 and a rear door 28, as seen in FIGS. 2 and 13, for example. Each rear door panel 26 is provided with a pair of openings to allow the front and rear tubes 16 and 18 to project out of the rear passenger compartment. The rear doors 28 are suitably configured to close the remaining space and are fitted with usual hinges and handles, as will be apparent.

A pair of arm rests 29 of inverted U-shape are welded to the opposite extremities of the front and rear support tubes 16 and 18. Protuberances or tangs 31 are welded to the arm rests 29 and extend outwardly for projection into and attachment to receptacles (not shown) provided in the replacement rear doors 28 to hold them in position. The doors operate like the original doors except that they are smaller and can be closed during filming operations.

The front and rear support tubes 16 and 18 are connected together adjacent their extremities by cross braces 30. These provide structural resistance to torsional and other forces tending to separate or twist the tubes.

Figure 6:
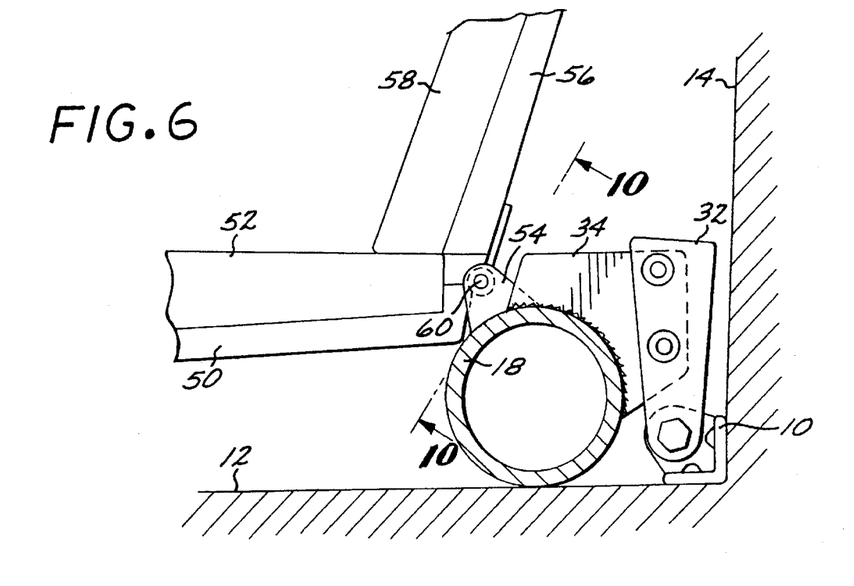
FIG. 6 is an enlarged detail view taken along the line 6—6 of FIG. 5, showing the manner of attachment of the frame to the attach bracket, and of the seats to the frame.
Figure 7:
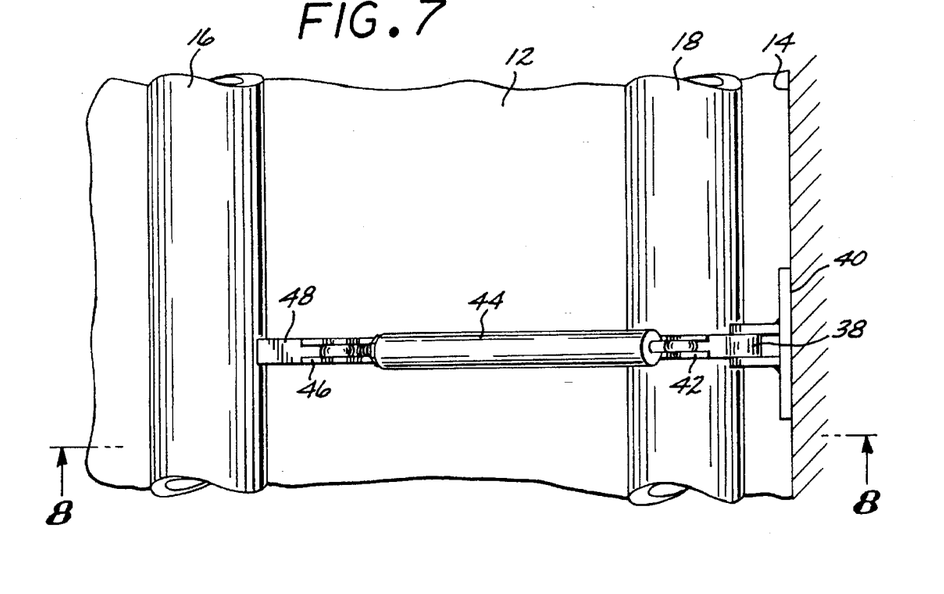
FIG. 7 is an enlarged detail view taken along the line 7—7 of FIG. 5.
Figure 8:
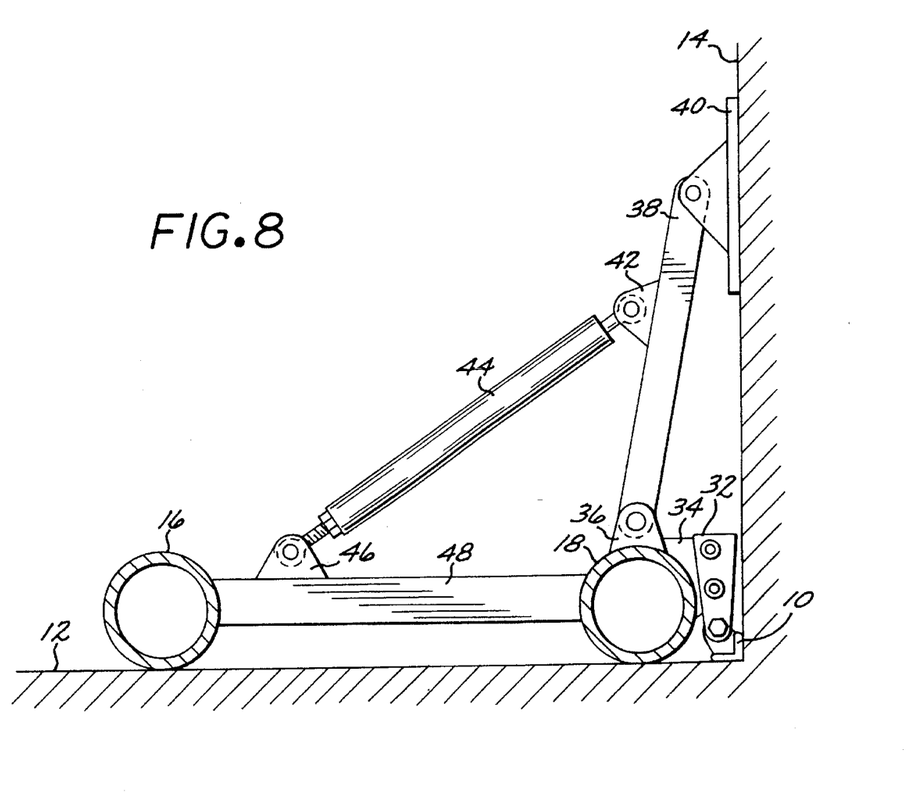
FIG. 8 is a view taken along the line 8—8 of FIG. 7.

The attachment frame is primarily held in position by four channel shape attach brackets 32 mounted to the four seat belt attachment tabs 10, as best seen in FIGS. 6 and 8. Each bracket 32 includes three vertically spaced sets of aligned openings in the channel walls. A bolt is disposed through the lowermost pair of openings in the bracket 32, and through the associated tab 10, and is secured there by a threaded nut. This secures the attach brackets to the seat belt attachment tabs.

The attachment frame is provided with four transversely spaced apart frame tabs 34 which are welded or otherwise fixed to the back of the attachment frame. Each tab 34 includes two vertically spaced sets of aligned openings. When the attachment frame is moved back to its proper location adjacent the rear bulkhead 14, the tabs 34 fit into the attach brackets 32, the respective openings are aligned, and quick release fittings 17 are inserted into the openings to hold the attachment frame in position on the seat support 12 and adjacent the rear bulkhead 14.

The rear support tube 18 of the attachment frame includes upwardly directed frame tabs 36 at its opposite extremities which pivotally mount the lower ends of a pair of pivot arms 38, respectively, as seen in FIG. 8. The upper ends of the pivot arms 38 pivotally mount thrust pads 40 which rest against the rear bulkhead 14.

Below the points of pivotal mounting of the upper ends of the pivot arms 38 to the thrust pads 40, the pivot arms are each provided with a channel shape bracket 42 which pivotally mounts the upper end of an extensible and retractable adjustment device or turnbuckle 44. The lower ends of the pair of turnbuckles 44 are pivotally attached respectively, to a pair of upwardly directed frame tabs 46 which are welded to a pair of anchorage portions 48 extending between the front and rear support tubes 16 and 18.

Operation of the pair of turnbuckles 44 to extend their opposite ends will forcibly urge the thrust pads 40 against the rear bulkhead 14, and thereby firmly hold the attachment frame snugly against the rear seat support. Thus, the frame can be quickly mounted in position by first coupling the rear tube 18 to the attach brackets 32 carried by the seat belt attachment tabs 10, and thereafter adjusting the turnbuckles 44 to preload the thrust pads 40 against the rear bulkhead 14.

Figure 5:
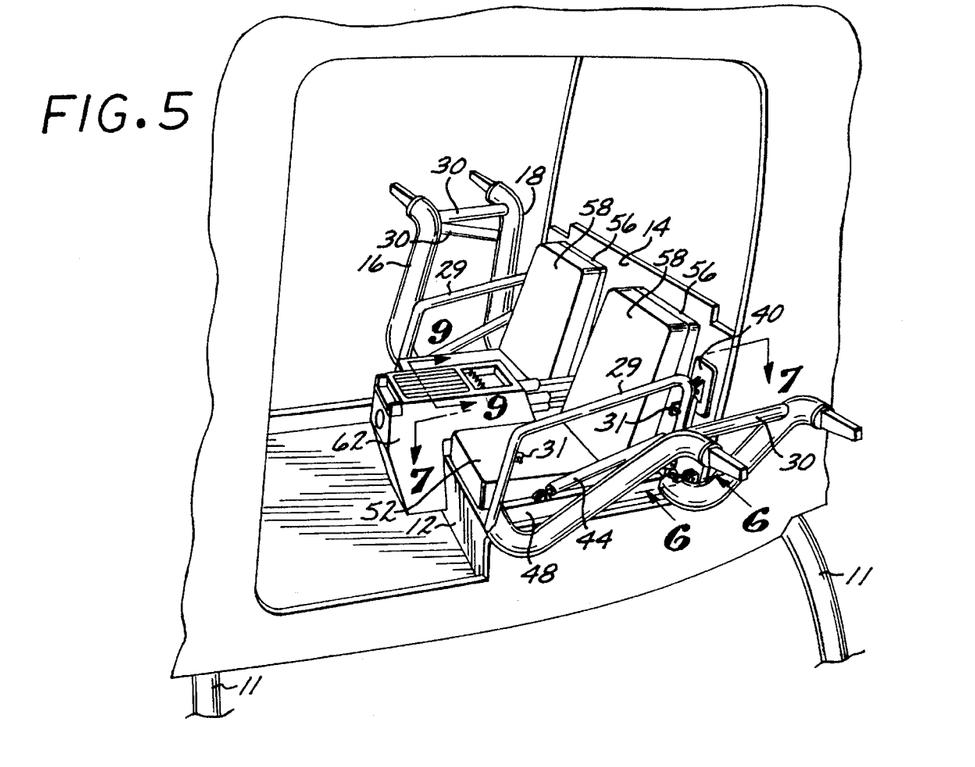
FIG. 5 is a view similar to FIG. 3, but illustrating the rear passenger compartment as it would appear with the present attachment frame installed.
Figure 10:
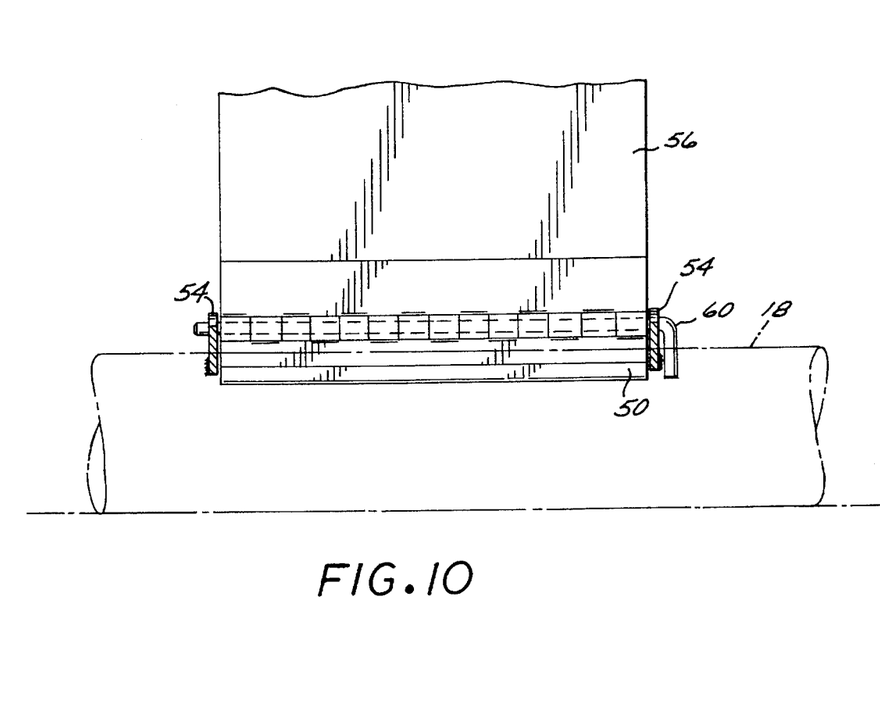
FIG. 10 is a partial rear elevational view of the rear support tube of the attachment frame illustrating the manner of mounting of the seats to the rear tube.
Figure 11:
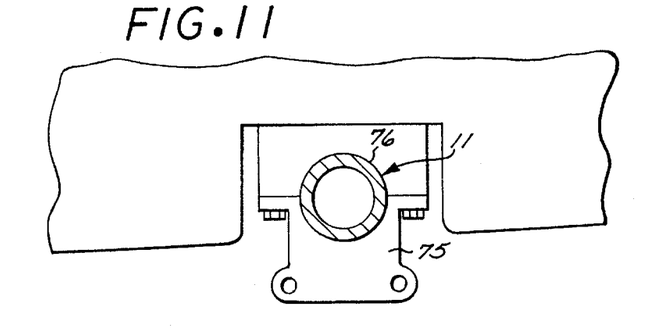
FIG. 11 is a detail view taken along the line 11—11 of FIG. 1, illustrating the attachment bracket on the helicopter skid structure.

As best seen in FIGS. 5, 6 and 10, a pair of transversely spaced apart seat bases 50 support seat cushions. Each seat base is attached to and is supported in position by the support tubes 16 and 18. A pair of upwardly directed frame tabs 54 are welded to the rear support tube 18 for use as occupant seat belt attach points. Each seat base 50 includes a lower hinge half provided with hinge knuckles which interfit with the hinge knuckles of an upper hinge half carried by a seat back 56 that supports a back cushion 58. A hinge pin 60 is passed through the interfitted hinge knuckles to detachably mount the backs 56 to the bases 50.

Suitable frame tabs 54 are welded to the rear support tube 18 or other structure of the attachment frame to serve as seat belt attachment tabs in lieu of the original seat belt tabs which are being used to mount the attach brackets 32.

The seats are spaced apart to provide room for a control console 62 to be mounted to the attachment frame. For this purpose, as seen in FIG. 9, a frame tab 64 is welded to the rear tube 18 and a nut and bolt assembly 66 is employed to secure the base of the console 62 in position. The console forms no part of the present invention. It is used by the cameraman in conjunction with a lap console (not shown) to operate the accessories package, and also to move the camera in the camera pod in a controlled manner, and also to operate other systems associated with the camera equipment.

Figure 12:
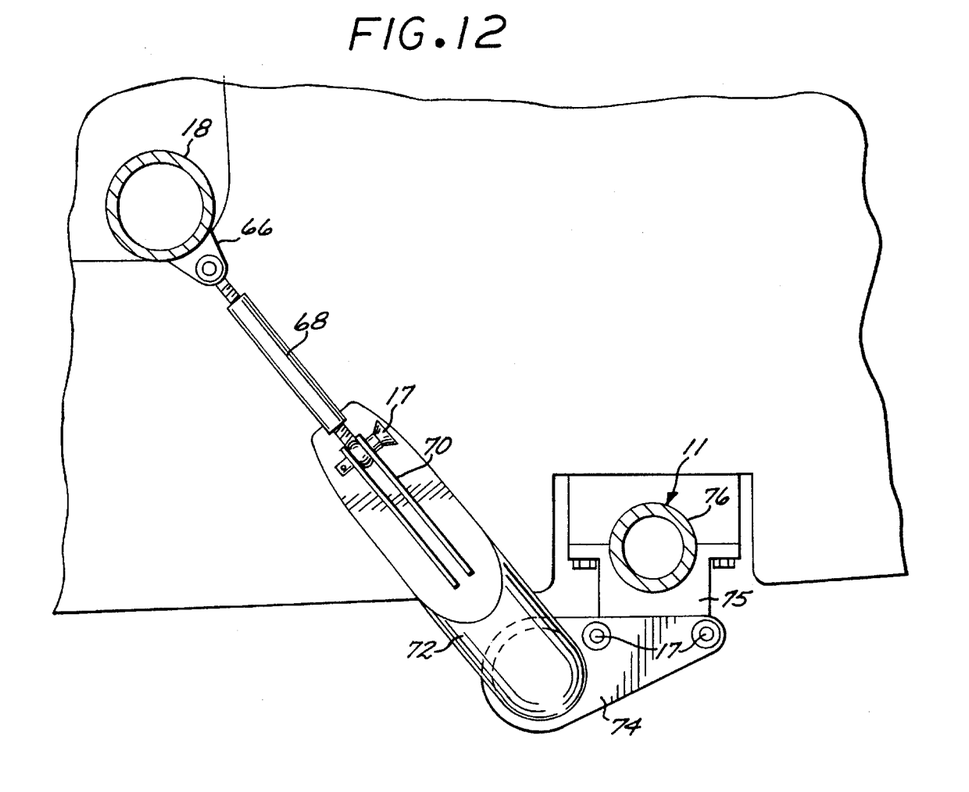
FIG. 12 is an enlarged detail view of the pull tube attached to the helicopter skid structure.

For added stability and structural rigidity, the attachment frame can be attached to the skid structure 11 of the helicopter, as seen in FIGS. 1, 2 and 12. Frame tabs 66 are welded to the rear support tube 18 in transversely spaced apart relation to pivotally support the upper ends of a pair of turnbuckles 68. The lower ends of the turnbuckles 68 are pivotally carried by channel shaped brackets 70 which are welded to the upwardly directed extremities of a U-shaped pull tube 72 that extends below and across the helicopter fuselage.

A pair of transversely spaced apart pull tube mount brackets 74 are clamped to the pull tube 72, and are bolted by a pair of quick disconnect fasteners 17 to a skid bracket 75 which is clamped to a transverse portion 76 of the skid structure 11. Tightening of the turnbuckles 68 to urge the turnbuckle ends toward one another will pull the rear support tube 18 downwardly and rearwardly to firmly hold the attachment frame in position.

Figure 14:
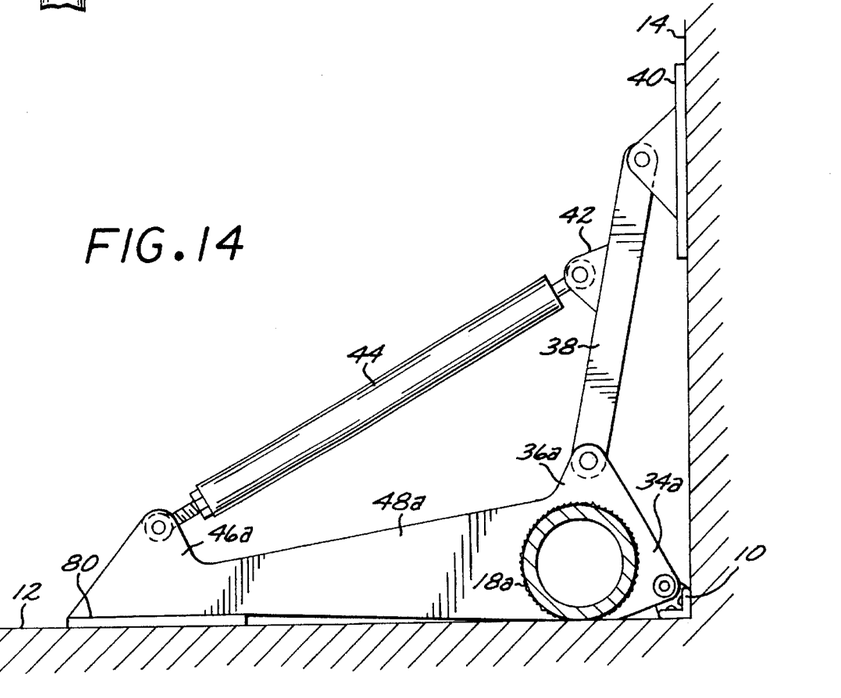
FIG. 14 is a view similar to the showing in FIG. 8, but illustrating a second or single support tube embodiment of the attachment frame.

A variation or second embodiment of the foregoing double tube embodiment is illustrated in FIG. 14. It comprises a single rearwardly disposed means, portion or rear support tube 18a. The subscript "a" is used to denote a part which is generally similar to the correspondingly numbered part of the first embodiment. The same numeral is used is the parts are substantially identical.

The seats are omitted, as are the attach brackets 32. Instead, the frame tabs 34 are attached directly to the existing seat belt attachment tabs.

Because the front support tube 16 is not used, the pair of anchorage portions 48 of the first embodiment are modified to extend further forward to the former location of the support tube 16, and are welded at their rearward extremities to the rear support tube 18a. The forward extremities of the modified anchorage portions 48a include a pair of thrust pads 80 for resting upon the rear seat support 12, as did the front support tube 16 of the first embodiment.

A frame tab 46a is made integral with the toe or forward extremity of each of the thrust elements 48a for pivotally carrying the pair of turnbuckles 44. As in the case of the first embodiment, operation of the turnbuckles to extend their opposite ends has the effect of pivoting the pivot arms 38 about the frame tabs 36a attached to the single rear tube 18a. This forcibly urges the thrust pads 40 against the rear bulkhead 14 and snugs the attachment frame firmly into proper position.

From the foregoing it will be apparent that the present attachment frame enables camera equipment to be quickly and easily mounted to an aircraft such as a helicopter, using attach points which are all located within the passenger compartment. If desired, further stability and structural rigidity can be obtained by also coupling the attachment frame to the external skid structure of the helicopter.

While different forms of the invention have been illustrated and described, it will be apparent that various modifications can be made without departing from the spirit and scope of the invention.

I claim:

1. An attachment frame for mounting camera equipment to an aircraft which includes a rear passenger compartment having a rear seat support, a rear bulkhead, and seat belt attachment tabs located adjacent the rear bulkhead, the attachment frame comprising:

elongated tubing means disposed through the rear passenger compartment and having opposite extremities extending out of the sides of the rear passenger compartment for externally supporting a camera pod and an accessories package, respectively, the tubing means having a rearward portion comprising a rear support tube attachable to the seat belt attachment tabs, the tubing means further having a forward portion comprising a pair of thrust elements fixedly coupled to the rear support tube and adapted to rest upon the rear seat support;

a pair of thrust pads adapted to rest against the rear bulkhead;

a pair of elongated pivot members having upper extremities pivotally mounted to the pair of thrust pads, respectively, and lower extremities pivotally coupled to the rearward portion of the tubing means; and adjustment means having rearward extremities pivotally mounted to the pivot members, and forward extremities pivotally mounted to the forward portion of the tubing means, the adjustment means being adjustably extensible to urge the pair of thrust pads forcibly against the rear bulkhead to hold the attachment frame in position.

2. An attachment frame for mounting camera equipment to an aircraft which includes vertically oriented internal structure, horizontally oriented internal structure, and internally located attachment tabs adjacent the juncture of the internal structures, the attachment frame comprising:

elongated, spaced apart front and rear support means connected by reinforcing structure, the rear support means being disposed transversely through the aircraft interior and having opposite extremities extending out of the sides of the aircraft interior for externally supporting items of camera equipment, the rear support means being adapted for coupling to the attachment tabs, and the front support means being adapted to rest upon the horizontally oriented internal structure;

thrust pad means adapted to rest upon the vertically oriented internal structure;

elongated pivot means having upper extremities pivotally coupled to the thrust pad means, and lower extremities pivotally coupled to the rear support means, respectively;

extensible and retractable means having rearward extremities pivotally coupled to the pivot means, and forward extremities pivotally coupled to the front support means, the extensible and retractable means being adjustably extensible to press the thrust pad means against the vertically oriented internal structure and to press the front support means against the horizontally oriented internal structure to thereby hold the attachment frame in position between the vertically oriented and horizontally oriented internal structures.

3. An attachment frame for mounting camera equipment to an aircraft which includes vertically oriented internal structure, horizontally oriented internal structure, and internally located attachment tabs adjacent the juncture of the internal structures, the attachment frame comprising:

an elongated rear support tube including a pair of forwardly projecting members, the tube being disposed through the aircraft interior and having opposite extremities extending out of the sides of the aircraft interior for externally supporting items of camera equipment, the tube being adapted for coupling to the attachment tabs, and further adapted to rest upon the horizontally oriented internal structure;

thrust pad means adapted to rest upon the vertically oriented internal structure;

elongated pivot means having upper extremities pivotally coupled to the thrust pad means, and lower extremities pivotally coupled to the tube;

extensible and retractable means having rearward extremities pivotally coupled to the pivot means, and forward extremities pivotally coupled to the forwardly projecting anchorage portions, the extensible and retractable means being adjustably extensible to press the thrust pad means against the vertically oriented internal structure and to press the forwardly projecting members against the horizontally oriented internal structure to thereby hold the attachment frame in position between the vertically oriented and horizontally oriented internal structures.

4. An attachment frame for mounting camera equipment to an aircraft which includes a rear passenger compartment having a rear seat support, a rear bulkhead, and seat belt attachment tabs located adjacent the rear bulkhead, the attachment frame comprising:

tubing structure including elongated front and rear support tubes disposed through the rear passenger compartment and having opposite extremities extending out of the sides of the rear passenger compartment for externally supporting a camera pod and an accessories package, respectively, the tubes having reinforcing braces connecting them, the rear support tube being adapted for coupling to the seat belt attachment tabs, the front support tube being adapted to rest upon the rear seat support; and adjustment means connected between the support tubes and operative to press the support tubes forcibly against both the rear seat support and the rear bulkhead to thereby press the attachment frame in position between the rear seat support and the rear bulkhead.

5. An attachment frame according to claim 4 wherein the adjustment means comprises a pair of turnbuckles.

6. An attachment frame for mounting camera equipment to an aircraft which includes a rear passenger compartment having a rear seat support, a rear bulkhead, and seat belt attachment tabs located adjacent the rear bulkhead, the attachment frame comprising:

tubing structure including an elongated rear support tube disposed through the rear passenger compartment and having opposite extremities extending out of the sides of the rear passenger compartment for externally supporting a camera pod and an accessories package, respectively, the tube having a forwardly projecting anchorage portions including forward thrust pads, the tube being adapted for coupling to the seat belt attachment tabs, the forward thrust pads being adapted to rest upon the rear seat support;

a pair of rearward thrust pads coupled to the tube and adapted to rest against the rear bulkhead; and adjustment means connected between the forward thrust pads and the rearward thrust pads for pressing the attachment frame in position between the rear seat support and the rear bulkhead.

7. An attachment Frame according to claim 6 wherein the adjustment means comprises a pair of turnbuckles.

8. An attachment frame for mounting camera equipment to an aircraft which includes a rear passenger compartment having a horizontally oriented rear seat support, a vertically oriented rear bulkhead located behind and extending upwardly from the rear seat support and seat belt attachment means located adjacent the rear bulkhead the attachment frame comprising:

elongated support structure disposed transversely through the rear passenger compartment and having opposite extremities extending out of the sides of the rear passenger compartment for externally supporting a camera pod and an accessories package, respectively, the support structure having a rearwardly disposed portion attachable to the seat belt attachment means, the support structure further having forwardly disposed anchorage means adapted to rest upon the rear seat support;

thrust pad means adapted to rest against the rear bulkhead;

elongated pivot means having upper extremities pivotally mounted to the thrust pad means, and lower extremities pivotally coupled to the rearwardly disposed portion of the support means; and elongated adjustment means having rearward extremities pivotally mounted to the pivot means, and forward extremities pivotally mounted to the anchorage means, the adjustment means being adjustably extensible to press the thrust pad means against the rear bulkhead, and to press the anchorage means against the rear seat support, thereby to hold the attachment frame in position between the rear seat support and the rear bulkhead.

9. An attachment frame according to claim 8 wherein the rearwardly disposed portion of the support structure comprises a rear support tube, and the forwardly disposed portion of the support structure comprises anchorage means integral with the rear support tube, and extending forwardly for resting upon the rear seat support structure.

10. An attachment frame according to claim 8 wherein the rearwardly disposed portion of the support structure comprises a rear support tube, and the forwardly disposed portion of the support structure comprises a front support tube adapted to rest upon the rear support structure, and attached to the rear support tube.

11. An attachment frame according to claim 8 wherein the adjustment means comprises turnbuckle means.

12. An attachment frame according to any of claims 1, 2, 3, 4, 6 and 8, wherein the aircraft includes external structure below and rearwardly of the passenger compartment, and including tensioning means coupled between the external structure and the attachment frame portion located within the aircraft interior, the tensioning means being operative to pull the attachment frame portion downwardly and rearwardly to secure the attachment frame in position.

* * * * *